United States Patent
Zakharov

(10) Patent No.: US 10,831,419 B1
(45) Date of Patent: Nov. 10, 2020

(54) FIRMWARE UPGRADE SYSTEM FOR PRINTING DEVICES HAVING A COMPONENT

(71) Applicant: Kyocera Document Solutions Inc., Osaka (JP)

(72) Inventor: Oleg Y. Zakharov, Walnut Creek, CA (US)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 16/748,409

(22) Filed: Jan. 21, 2020

(51) Int. Cl.
*G06F 3/12* (2006.01)
*G06F 8/65* (2018.01)
*G06F 8/61* (2018.01)

(52) U.S. Cl.
CPC .............. *G06F 3/121* (2013.01); *G06F 3/123* (2013.01); *G06F 3/1229* (2013.01); *G06F 8/62* (2013.01); *G06F 8/65* (2013.01)

(58) Field of Classification Search
CPC ......... G06F 3/1225; G06F 3/121; G06F 3/123
See application file for complete search history.

(56) References Cited

U.S. PATENT DOCUMENTS

| | | | |
|---|---|---|---|
| 2002/0067504 A1* | 6/2002 | Salgado | G06F 3/1225 |
| | | | 358/1.15 |
| 2008/0320110 A1 | 12/2008 | Pathak | |
| 2013/0111459 A1 | 5/2013 | Nakamoto | |

* cited by examiner

*Primary Examiner* — Eric A. Rust
(74) *Attorney, Agent, or Firm* — Millen, White, Zelano & Branigan, P.C.; William Nixon

(57) ABSTRACT

A system of printing devices installs an upgrade version of firmware for the devices on a limited number of devices before doing a total installation. The number of the limited devices for analyzing the upgrade firmware is determined based on the failure rate of the devices. A ratio of failure is determined that is scaled by a factor to obtain the number of test devices. An analytical time interval also is determined to test the upgrade firmware on the limited number of devices. The failure rate within the limited number of devices is monitored to determine whether to upgrade all of the applicable devices.

20 Claims, 14 Drawing Sheets

| Model: AAA | Firmware Version | Total devices | Affected by errors in 2019 |
|---|---|---|---|
| C9999 | FW 0001 | 5,000 | 2% |
| C9999 | FW 0002 | 10,000 | 1% |
|  | FW 0003 (new) | - | - |

Fig. 9

| Error Code | Description | Failure Rate in timeframe 1 |
|---|---|---|
| C0001 | Hard drive error | 0.5% |
| C0002 | Fuser issue | 2% |
| CF001 | Memory is full | 1% |
| CF002 | Network issue | 3% |

Fig. 10

FIRMWARE UPGRADE SYSTEM FOR PRINTING DEVICES HAVING A COMPONENT

FIELD OF THE INVENTION

The present invention relates to a system of printing devices that implements methods to determine whether to install a firmware upgrade on the printing devices, wherein the printing devices include a common component.

DESCRIPTION OF THE RELATED ART

Printing devices can upgrade firmware once a new version of firmware is available. Such upgrades may pertain to specific hardware or software components of the printing device. The upgrade, however, may result in additional or new errors or, in some instances, degrade performance of the printing devices. Further, once the firmware upgrade is performed on all the printing devices, any remediation or recall needs to happen for every device. These measures may result in lost time and increased costs associated with using the printing devices.

SUMMARY OF THE INVENTION

A method for upgrading a first firmware package of firmware for a plurality of printing devices is disclosed. The first firmware package corresponds to a component within each of the plurality of printing devices. The method includes determining a number of test printing devices from the plurality of printing devices based on a first failure rate for the plurality of printing devices. The method also includes determining an analytical time interval for the test printing devices according to a mean time between failures for the plurality of printing devices. The method also includes installing an upgrade firmware package for the first firmware package on the test printing devices. The method also includes determining a second failure rate for the component during the analytical time interval on the test printing devices. The method also includes determining whether to install the upgrade firmware package to the plurality of printing devices according to the second failure rate. The second failure rate corresponds to at least one failure event in the component in each of the test printing devices.

A system of a plurality of printing devices is disclosed. Each of the plurality of printing devices have a first firmware package of firmware. The first firmware package corresponds to a component within each of the plurality of printing devices. The system is configured to determine a number of test printing devices from the plurality of printing devices based on a first failure rate for the plurality of printing devices. The system also is configured to determine an analytical time interval for the test printing devices according to a mean time between failures for the plurality of printing devices. The system also is configured to install an upgrade firmware package for the first firmware package on the test printing devices. The system also is configured to determine a second failure rate for the component during the analytical time interval on the test printing devices. The system also is configured to determine whether to install the upgrade firmware package to the plurality of printing devices according to the second failure rate. The second failure rate corresponds to at least one failure event in the component in each of the test printing devices.

A server to upgrade a first firmware package of firmware for a plurality of printing devices is disclosed. The first firmware package corresponds to a component with each of the plurality of printing devices. The server includes a processor. The server also includes a memory coupled to the processor. The memory stores instructions that, when executed on the processor, configures the server to determine a number of test printing devices from the plurality of printing devices based on a first failure rate for the plurality of printing devices. The server also is configured to determine an analytical time interval for the test printing devices according to a mean time between failures for the plurality of printing devices. The server also is configured to install an upgrade firmware package for the first firmware package on the test printing devices. The server also is configured to determine a second failure rate for the component during the analysis time interval on the test printing devices. The server also is configured to determine whether to install the upgrade firmware package to the plurality of printing devices according to the second failure rate. The second failure rate corresponds to at least one failure event in the component in each of the test printing devices.

BRIEF DESCRIPTION OF THE DRAWINGS

Various other features and attendant advantages of the present invention will be more fully appreciated when considered in conjunction with the accompanying drawings.

FIG. 9 illustrates a table showing failure rates for each set of devices with different versions of firmware according to the disclosed embodiments.

FIG. 10 illustrates a table showing failure rates for each group of error codes for a set of devices according to the disclosed embodiments.

DETAILED DESCRIPTION OF THE PREFERRED EMBODIMENTS

Figure 1:
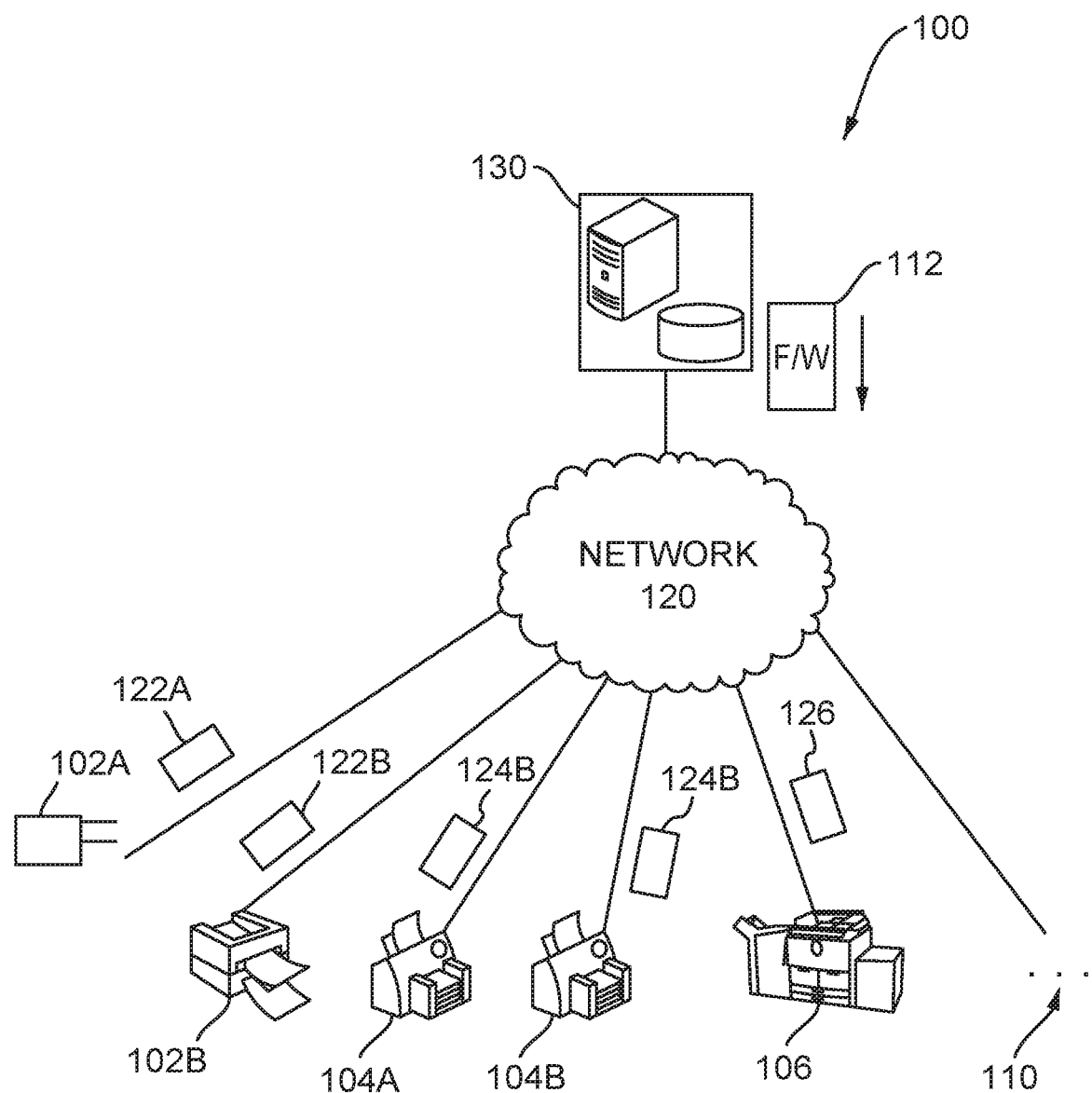
FIG. 1 illustrates a block diagram of a system of a plurality of printing devices and coupled to a server to monitor and upgrade the plurality of printing devices according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

Printing devices may upgrade firmware once a new version of firmware is available. A server or other device connected to the printing devices may send the upgrade over a network of the coupled devices. The printing devices, however, may not be identical in components, hardware, or software. The firmware may act differently on the different devices. For example, a firmware upgrade can introduce degrades in operation capability or new types of errors. To reduce a risk of new error or degrades, the disclosed embodiments deploy the firmware upgrade to a limited number of devices. The small group of devices with upgraded firmware will be monitored for a failure rate. The disclosed embodiments use the failure to make decisions about upgrading the firmware for other devices.

New firmware may be installed on a plurality of printing devices remotely from a server or other device. The upgraded firmware is installed on the device through a network, such as a wired or wireless network within an organization. The number of errors with a specific error code can be collected on periodic basis, such as daily, from the devices. All devices may be marked with a version of the firmware and the dates when the latest firmware version was installed. These groups of related devices may be known as sets of devices. Each set of devices, related by a device model and a firmware version, will have a calculated failure rate based on the number of errors occurring in each group of devices. The firmware version, such as the upgraded version, will be discontinued in the instance that new errors occur or degrades manifest within the set of devices.

According to the disclosed embodiments, a new version of released firmware is installed on a limited number of devices. The number of devices should be relatively small in order to reduce a risk of new errors. The number, however, also should be proportionally correlated with a population of devices that had errors with a previous version of the firmware.

The disclosed embodiments provide a method to collect information from two sets of a plurality of printing devices in a remote manner during two analytical time intervals. The first set of devices operates a recent version of the firmware. Both sets of printing devices include the same device model. The collected information may consist of firmware version, date of firmware installation, and a number of errors labeled with an error code and print volume. Print volume may refer to the number of pages printed during a period of time, such as a month or year.

During each of the analytical intervals, the failure rate is calculated as a ratio of devices with specific error codes per total number of devices in the first set of devices. The number of total devices in the first set is determined based on a failure rate of the second set of devices. The analytical time interval of the first set of devices is determined based on mean time between failures on the second set of devices. The print volume of the first set of devices is determined based on print volume of the second set of devices. By comparing the first failure rate and the second failure rate, a decision about installation of the latest version of firmware can be made after the first analytical time interval.

The type of errors that may be experienced on a printing device may vary between device models. Software-related errors may include a memory leak. Hardware-related errors may include image quality effects, print volume, paper jams, broken parts, and the like. The types of firmware may include main, network, or image processing.

FIG. 1 depicts a block diagram of a system 100 of a plurality of printing devices coupled to an analytical server 130 to monitor and upgrade the plurality of printing devices according to the disclosed embodiments. System 100 includes printing devices connected to analytical server 130 via network 120. The plurality of printing devices include printing devices 102A, 102B, 104A, 104B, 106, and additional printing devices 110. Printing devices 102A and 102B may be similar device models while printing devices 104A and 104B also may be similar device models that differ from printing devices 102A and 102B. Printing device 106 may be a different model altogether. Additional printing devices may be associated with the different models. Further, system 100 may include additional models of printing devices not shown here for brevity.

A given printing device may be configured to perform one or more functions such as printing, scanning, emailing, storing, modifying, receiving, or transmitting one or more documents or files. In some embodiments, each printing device may include hardware and software components associated with a firmware package. Firmware may refer to packages of software installed on embedded devices. Each firmware may include a version for the different packages for the components within the printing device. A version of firmware, or firmware 112, may be sent from analytical server 130 to one or more printing devices within system 100.

Each printing device 102A, 102B, 104A, 104B, 106, and 110 may be configured to perform one or more steps, actions, or functions disclosed herein. For example, printing device 102A may communicate with analytical server 130 to transmit or receive data, or information, 122A via network 120, including error codes, print counter values, time stamps, error intervals, mean time between failures (MTBF), error frequency codes, time intervals, numbers of printed pages, numbers of errors, print volume, and other related information. Each printing device may send and receive its own data packages, as shown in FIG. 1. Data may be routed within system 100 using a protocol, such as TCP/IP, in that each device includes it own unique network address. Thus, printing device 102B may transmit or receive data 122B, printing device 104A may transmit or receive data 124A, printing device 104B may transmit or receive data 124B, printing device 106 may transmit or receive data 126, and so on.

Analytical server 130 may include a cloud-based server, for example, that can perform one or more tasks to manage or maintain printing devices within system 100. Analytical server 130 may communicate with printing devices 102A, 102B, 104A, 104B, 106, and 110 to transmit and receive data. Analytical server 130 also may install firmware 112 on one or more of the printing devices. In some embodiments, analytical server 130 may transmit a command to one or more of the printing devices to reset, install updates, or perform one or more printing or maintenance functions or operations. In other embodiments, analytical server 130 may receive data from one or more printing devices, shown as data 122A-126, such as error codes, print counter values, time stamps, error intervals, mean time between failures (MTBF), error frequency codes, time intervals, numbers of printed pages, numbers of errors, print volume, and other related information.

Analytical server 130 may be configured to perform one or more functions to determine whether to upgrade one or more printing devices with firmware 112. Firmware 112 may represent a version of firmware that may be used to replace one or more firmware packages on a set of printing devices. For example, firmware 112 may be used to upgrade every printing device in system 100 or only a group of printing devices, such as devices 102A and 102B having the same model. Analytical server 130 performs the analysis of incoming data from the printing devices to determine whether to upgrade them with firmware 112. As noted above, firmware 112 may be a firmware package corresponding to only a part of the printing device, such as main, network, or image processing. Failure rates and other information provided by the printing devices determines how or if the upgrade to firmware 112 will be sent or installed.

Analytical server 130 may include one or more computing devices or systems. It also may be consolidated into a single physical location or distributed across two or more physical locations. Analytical server 130 may include hardware, software, or firmware configured to perform one or more functions disclosed below. Analytical server 130 is disclosed in greater detail by FIG. 3.

Network 120 in system 100 may include one or more wired or wireless connections that support communication between the devices of system 100. In some embodiments, network 120 may support one or more communication protocols, such as Extensible Messaging and Presence Protocol (XMPP), File Transfer Protocol (FTP), HyperText Transport Protocol (HTTP), Java Message Service (JMS), Simple Object Access Protocol (SOAP), Short Message Service (SMS), Simple Mail Transfer Protocol (SMTP), Simple Network Management Protocol (SNMP), Transmission Control Protocol/Internet Protocol (TCP/IP), User Datagram Protocol (UDP), Lightweight Directory Access Protocol (LDAP), and the Message Queue (MQ) family of network protocols.

Network 120 is configured to allow communication between analytical server 130 and one or more printing devices within system 100, between the printing devices themselves, or between one or more other devices or systems and system 100. Such communications may include commands, requests, or data corresponding to documents, printing-device errors, or other data.

Figure 2:
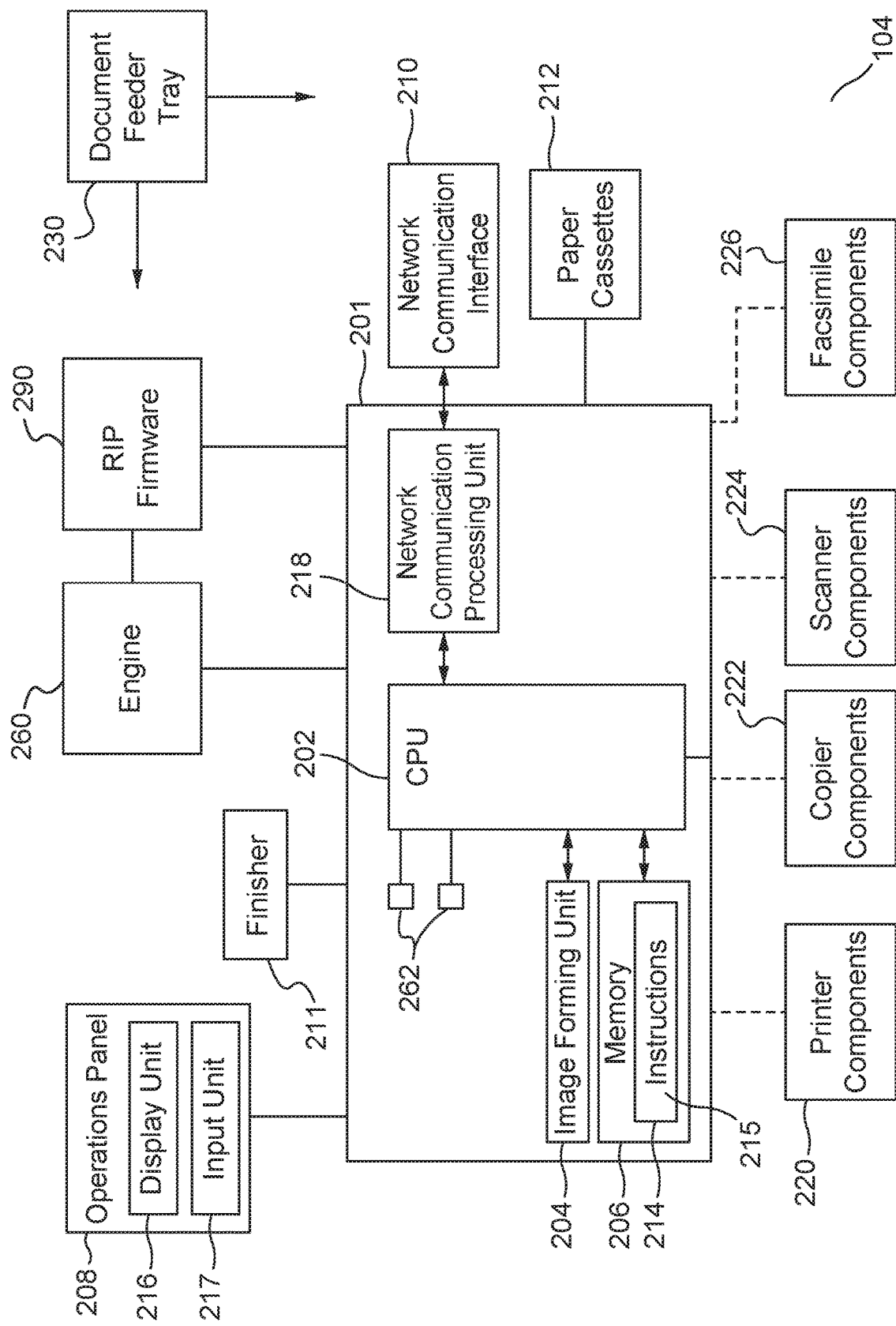
FIG. 2 illustrates a block diagram of components of a printing device according to the disclosed embodiments.

FIG. 2 illustrates a block diagram of components of a printing device according to the disclosed embodiments. In the disclosure of FIG. 2, printing device 104A may be referred to for illustrative purposes. The architecture shown in FIG. 2 may apply to any multi-functional printing device or image forming apparatus that performs various functions, such as printing, scanning, storing, copying, and the like. As disclosed above, printing device 104A may send and receive data from analytical server 130 and other devices within system 100.

Printing device 104A includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104A, using computing platform 201, may be configured to perform various operations, such as scanning, copying, printing, receiving or sending a facsimile, or document processing. As such, printing device 104A may be a printing device or a multi-function peripheral including a scanner, and one or more functions of a copier, a facsimile device, and a printer. To provide these functions, printing device 104A includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104A also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104A to receive papers and documents to be processed. A document is placed on or in document processor input feeder tray 230, which moves the document to other components within printing device 104A. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104A. For example, a storage location 214 may include data for running an operating system executed by computing platform 201 to support the components within printing device 104A. According to the disclosed embodiments, memory unit 206 may store the tokens and codes used in performing the deferral operations for printing device 104A.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104A to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104A to act as a printer, copier, scanner, and a facsimile device.

Printing device 104A also includes an operations panel 208, which may be connected to computing platform 201. Operations panel 208 may include a display unit 216 and an input unit 217 for facilitating interaction with a user to provide commands to printing device 104A. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104A.

Printing device 104A also includes network communication processing unit 218. Network communication processing unit 218 may establish a network communication using network 120, such as a wireless or wired connection with one or more other image forming apparatuses or analytical server 130. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104A. CPU 202 also may retrieve information stored in memory unit 206, such as settings for printing device 104A.

Printing device 104A also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104A.

In some embodiments, analytical server 130 may send updates to firmware on printing device 104A. Thus, engine 260 or RIP firmware 290 may be updated by firmware 112, which is a more recent version of the firmware installed on printing device 104A. The installation of the new firmware version, however, may result in additional errors or degradation of performance of printing device 104A. In this instance, printing device 104A may not install firmware 112.

To this end, printing device 104A may include one or more sensors 262 that collect data and information to provide to computing platform 201 or CPU 202. Each sensor 262 may be used to monitor certain operating conditions of printing device 104A. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104A. When a sensor 262 detects an operational issue or failure event, it may send a signal to CPU 202. CPU 202 may generate an error alert associated with the problem. The error alert may include an error code. Computing platform 201 may transmit the error alert along with the error code to analytical server 130.

Display unit 216 may display information about applicable error codes and a short description of the error associated with the operational issue or failure event. Further, display unit 216 may display an instruction on how to proceed (operate) to resolve the error. For example, if a network error occurred, then the following message may be provided on operations panel 208: Reboot the device.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104A communicates with analytical server 130 via network communication interface 210 by utilizing a network protocol, such as the ones listed above. In some embodiments, printing device 104A communicates with analytical server 130 through REST API, which allows the server to collect data from multiple devices via network 120. REST API and SOAP are application protocols used to submit data in different formats, such as files, XML messages, JSON messages, and the like. By utilizing applicable network communication protocols and application protocols, printing device 104A submits the applicable error code or codes to analytical server 130. Analytical server 130 collects error codes from individual devices and stores information in the database for further analysis. The database keeps data include device identification, timestamp, and error code.

Figure 3:
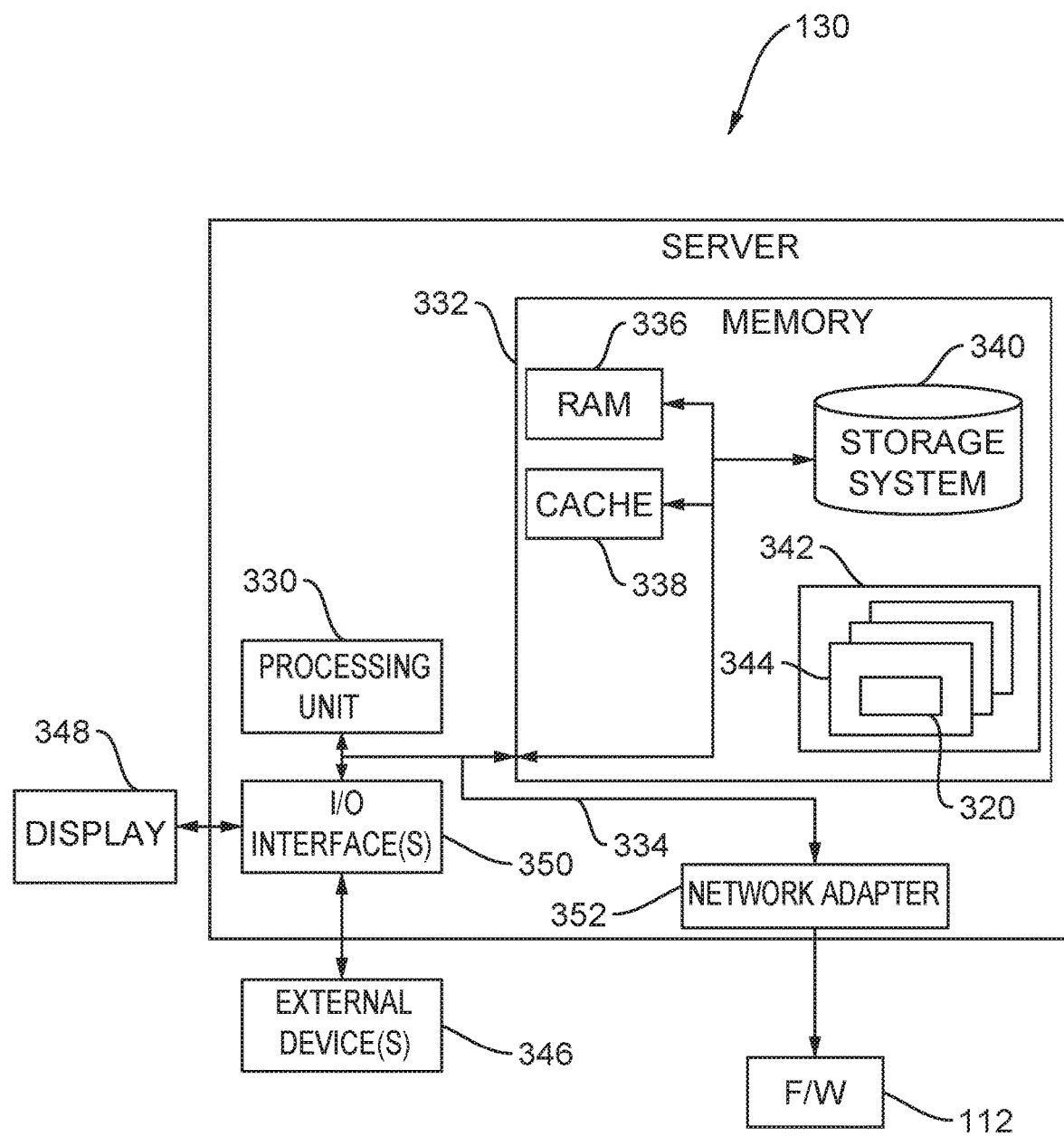
FIG. 3 illustrates a block diagram of an analytical server according to the disclosed embodiments.

FIG. 3 depicts a block diagram of analytical server 130 according to the disclosed embodiments. The components of analytical server 130 may include, but are not limited to, one or more processors or processing units 330 and a server memory 332. A server bus 334 couples various server components including server memory 332 to processor 330. Analytical server 130 may include a variety of computer readable media. Such media may be selected from any available media that is accessible by analytical server 130, including non-transitory, volatile, and non-volatile media, removable and non-removable media. Server memory 332 could include one or more personal computing readable media in the form of volatile memory, such as random access memory (RAM) 336 or a cache memory 338. In some embodiments, a storage system 340 may be provided for reading from and writing to a non-removable, non-volatile magnetic media device, such as a hard drive.

Server memory 332 may include at least one program product or utility 342 having a set, or at least one, of program modules 344 that may be configured to perform the functions of the disclosed embodiments. Program modules 344 may include, but are not limited to, an operating system, one or more application programs, other program modules, and program data. Each of the operating systems, one or more application programs, other program modules, and program data or some combination thereof, may include an implementation of a networking environment. Program modules 344 may perform the functions or methodologies of embodiments of the invention as disclosed herein. For example, a program module 344 in analytical server 130 may be configured to determine if components of one of the printing devices of system 100 needs to be replaced or fixed due to a failure event or error within the device.

Analytical server 130 may communicate with one or more external devices 46, such as a keyboard, a pointing device, a stylus, a display 348, or any similar devices, such as a network card, modem, and the like. Display 348 may be a light emitting diode (LED) display, a liquid crystal display (LCD) display, a cathode ray tube (CRT) display, and the like. External devices 346 may enable analytical server 130 to communicate with a printing device. Such communication may occur via input/output (I/O) interfaces 350. Alternatively, analytical server 130 may communicate with one or more networks 120 such as a local area network (LAN), a general wide area network (WAN), or a public network via a network adapter 352. Analytical server 130 may be coupled to network 120 via a wired or wireless connection. Network adapter 352 may communicate with the other components via bus 334.

Any combination of one or more computer readable media, for example, storage system 340, may be utilized. In the context of the disclosed embodiments, a computer readable storage medium may be any tangible or non-transitory medium that contains, or stores, a program, such as program product 342, for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

In some embodiments, analytical server 130 may release firmware 112, which is an upgrade to existing firmware on one or more printing devices within system 100. Firmware 112 may be forwarded to one or more printing devices through network adapter 352 when instructed by processing unit 330. Processing unit 330 may execute instructions stored in server memory 332 to configure analytical server 130 to perform the steps and functions disclosed below. Specifically, instructions stored in program modules 344 may determine whether to upgrade firmware within the plurality of devices in system 100 based on the processes disclosed below.

Each set of printing devices, such as printing devices 102A and 102B and printing devices 104A and 104B, may be related to each other by a model and firmware version. For example, printing devices 102A and 102B may be the same model of device while running the same version of firmware that relates to firmware 112 to be sent to devices within system 100. In other embodiments, printing devices 102A, 102B, and 106 may be the same model of device but printing device 106 runs a different version of firmware than devices 102A and 102B. Each set will have a calculated failure rate based on the number of errors that occur in each set of devices. In other embodiments, the calculated failure rate may correspond to an error code for a failure event that occurs will the firmware is running With a firmware upgrade, if new errors occur or existing errors increase in occurrence within the set of devices, then the upgraded firmware version will be discontinued. Analytical server 130 may monitor the plurality of devices within system 100 to determine when and if to upgrade firmware to the devices.

Analytical server 130 installs a new version of the firmware on a limited number of devices. The number of devices to receive the upgraded firmware should be relatively small to reduce the risk of new errors or performance degradation of the firmware. Installation of the upgraded firmware to all or a large number of devices may result in increased costs to remedy or remove if these problems occur. The number of test devices, however, also should proportionally correlate with a population of devices that had errors with the existing version of the firmware installed thereon.

Figure 9:
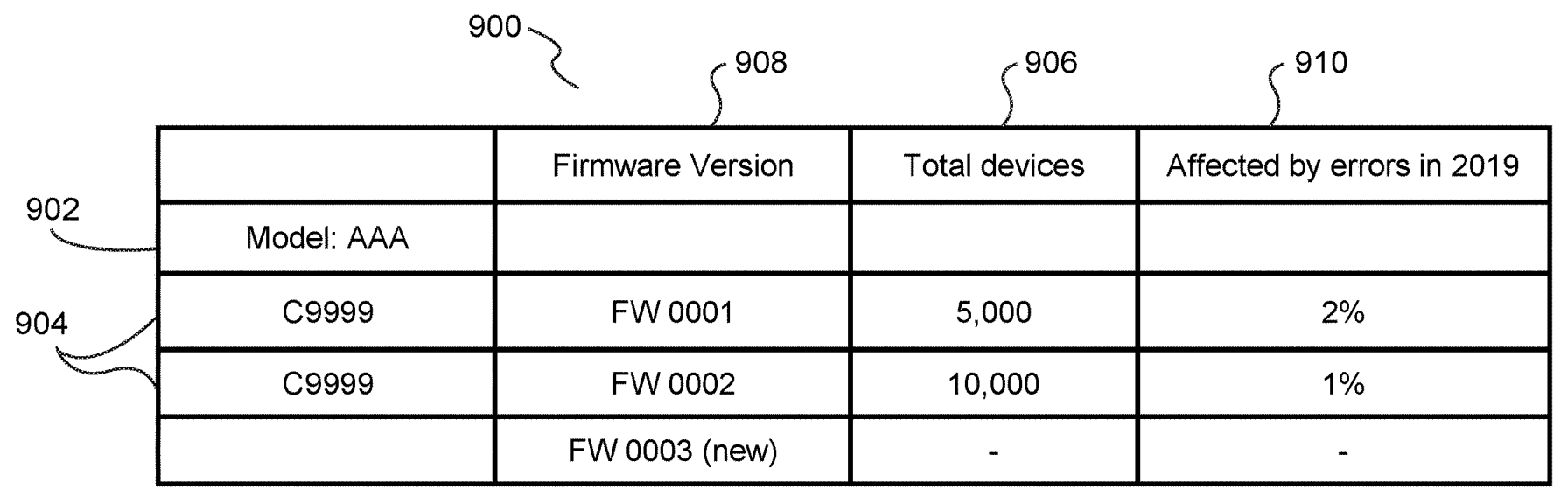

In some embodiments, analytical server 130 determines a number of test devices to receive upgraded firmware, shown as firmware 112. The number may also be known as a set of devices. In this instance, the set of devices is selected from a larger set of devices within the plurality of devices within system 100. Referring to FIG. 9, table 900 lists device model 902 for a group of devices. Device model 902 lists device model AAA as one of the device models. Each device model 902 also may be associated with error codes 904, which correspond to the various errors detected within the devices running the firmware. Within system 100, there may be a total number 906 of 15,000 devices of model AAA. Referring to FIG. 1, printing devices 102A and 102B may be device model AAA. Device model AAA may include firmware versions 908. Of the 15,000 devices of model AAA, a number of 5,000 devices, such as printing device 102A, host firmware version 0001 and a number of 10,000 devices, such as printing device 102B, host firmware version 0002. Analytical server 130 may determine whether to install firmware version 0003 on each set of devices.

The number for the set of test devices for each firmware version 908 may vary. The set of test devices running firmware version 0001 will differ from the set of test devices running firmware version 0002. Analytical server 130 will determine failure rates 910 for each set of devices. As shown in table 900, a failure rate for error code C9999 for firmware version 0001 is 2%. A failure rate for error code C9999 for firmware version 0002 is 1%.

Analytical server 130 executes a sampling process to determine the number of test devices for each firmware version. In some embodiments, the number of test devices selected to install and execute firmware version 0003 should be twice as large as the previous ratio for failure for the legacy firmware version. Thus, for each set of devices, the following equation may be used by analytical server 130 when executing the disclosed processes:

$$\text{Number of devices (analysis)} > I*(100\%/\text{Failure Rate}), \quad \text{(Equation 1)}$$

where I is an integer of multiplication. In some embodiments, I may be equal to 2 so that the number of test devices is at least twice as large as the previous ratio of failure. The value for I may be adjusted according to the demands of the firmware upgrade. An upgrade that is particularly important or sensitive may require a higher integer value to properly test the failure rates caused by the new firmware. The ratio of failure may be defined as 100% divided by failure rate 910.

Referring to the different firmware versions 908, firmware version 0001 may need a number of test devices greater than 2*(100%/1%) or 200 devices out of the 10,000 devices to receive firmware version 0003. Firmware version 0002 may need a number of test devices greater than 2*(100%/2%) or 100 devices out of the 5,000 devices to receive firmware version 0003. It should be noted that the difference in number is not because of the total number 906 of devices. For example, if a different error code 904 is analyzed that corresponds to errors which occur in 50% of the devices, then the test set of devices will be relatively small in order to confirm that upgrade firmware 112 does not result in new errors or degradation of the firmware. According to this example, the number of test devices would be 2*(100%/50%), or only 4 devices. Analytical server 130 may determine these numbers based on collected data for each model 902. Because the higher failure rates are more likely to occur, a large number of test devices is not needed. The occurrences of the more frequent errors, or failure events, will manifest themselves quicker and with less operating time than less frequent ones.

The failure rate used by analytical server 130 to perform such determinations may be calculated from a previous version of the firmware. Thus, the disclosed embodiments track failure events and the corresponding time and date using analytical server 130. Failure rate may be defined as:

$$\text{Failure Rate} = 100 * (\text{number of devices having error}/\text{total number of devices}). \quad \text{(Equation 2)}$$

For example, if only 100 devices incur a specific error, or failure event, having an error code C11 out of 10,000 total devices, then the available failure rate is FR(C11)=100*(100/10,000)=1%. Thus, the failure rate may be calculated as a ratio of total errors, or failure events, devices by a total number available devices.

Examples of failure rates determined by analytical server 130 using this analysis are shown in FIG. 10. Further, the failure rate 910 should be determined over a set period of time, such as daily, weekly, monthly, and the like. The set period of time may be used to determine a mean time between failures (MTBF), disclosed in more detail below.

FIG. 10 depicts table 1000 showing failure rates 1006 for each group of error codes 1002 according to the disclosed embodiments. Table 1000 includes entries for error codes 1002, error code descriptions 1004, and failure rates 1006. Failure rates 1006 may correspond to failure rates 910 disclosed above. The difference between failure rates 1006 and failure rates 910 is that failure rates 1006 relate to error codes as opposed to sets of devices. As shown in table 1000, the value of each failure rate 1006 is calculated for each error code 1002.

Error codes 1002 may include C0001 for a hard drive error, C0002 for a fuser issue, CF001 for the memory being full, and CF002 for a network issue. Error codes 1002 may be listed by the device manufactured, such as model AAA disclosed above, and commonly grouped by the type of hardware failure or software failure. Referring to table 1000, C-code errors may relate to hardware failures while CF-codes relate to software failures including network problems or print job processing problems.

Firmware versions may include different packages for the hardware and software components. These packages may relate to the different groups of failures. For example, the firmware may include a software package to access memory, which invokes error code CF001 when the memory is full. Another package may be a hardware package for firmware for the hard drive, which invokes error code C0001 when there is a hard drive failure.

As shown in table 1000, the different error codes 1002 have different failure rates 1006. Error code C0001 may have a failure rate of 0.5%. Error code C0002 may have a failure rate of 2%. Error code CF001 may have a failure rate of 1%. Error code CF002 may have a failure rate of 3%. Referring back to the determination for the number of test devices, a set of devices may be determined for each error code. Thus, analytical server 130 may determine that the number of test devices for error code C0001 of firmware version FW 0001 is 2*(100%/0.5%) or 400 devices on which to install the upgraded firmware to properly analyze whether it is effective. In contrast, the number of test devices for error code CF002 of firmware version FW 0001 is 2*(100%/3%) or 67 devices to properly analyze the upgraded firmware. Thus, there are different options in determining how many devices should install the upgraded firmware. In these instances with different error codes, the devices may install the packages pertaining to the error codes for analysis.

Figure 11:
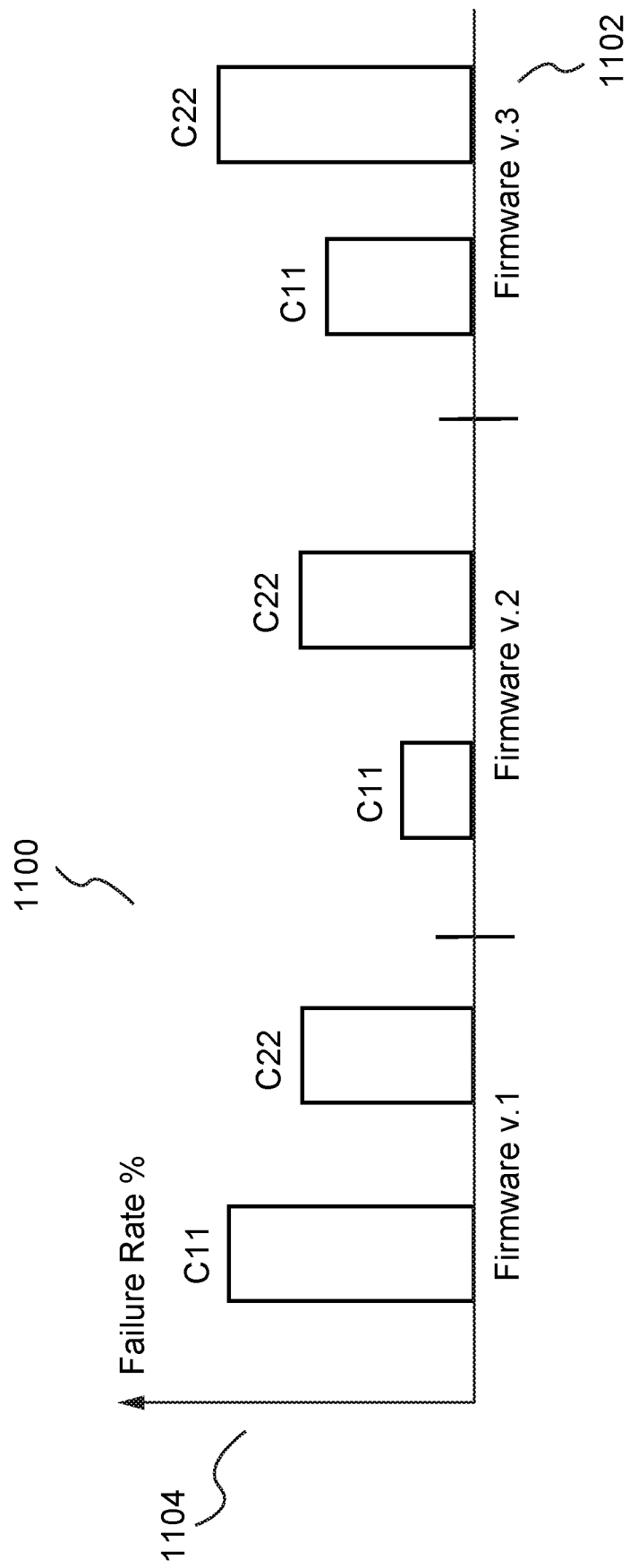
FIG. 11 illustrates a graph of failure rates for different firmware versions and different error codes according to the disclosed embodiments.

FIG. 11 depicts a graph 1100 of failure rates for different firmware versions and different error codes according to the disclosed embodiments. Axis 1102 shows the different firmware versions for firmware 112 installed on devices within system 100. Analytical server 130 may receive data 122A-126 from the devices, as shown in FIG. 1. The analytical server uses this data to determine the failure rates and stores them in a database, such as storage system 340.

As shown in FIG. 11, the different firmware versions may have different failure rates among the different error codes. Referring to firmware version 1, error code C11 may have a higher failure rate that error code C22 for those devices running this firmware. Firmware version 2 has a lower failure rate for error code C11 and about the same for error code C22. Firmware version 3 has higher failure rate for error code C22 than error code C11 as well as a higher failure rate of error code C22 than the other firmware versions. Preferably, any upgrade firmware should address failure events related to error code C22. Thus, analytical server 130 may determine failure rates based on the input parameters of number of errors, error code, number of devices, and firmware version. Analytical server 130 may update these parameters after every monitor time period, such as daily, weekly, monthly, and the like. This historical data for the devices in system 100 may be stored in a database.

Analytical server 130 also may determine an analytical time interval in which to monitor the number of test devices to determine the failure rates of the failure events on the devices. In other words, an appropriate time interval is determined as the same time period may not be applicable to all firmware environments. Firmware having more frequent errors may not need as long of a time interval for analysis. Rare errors may need a longer monitoring time to determine if the upgrade improves the failure rate. Thus, analytical server 130 determines the MTBF for devices running firmware packages. The MTBF may be used to determine the analytical time interval for any upgrade firmware installed on the selected set of devices.

Figure 12:
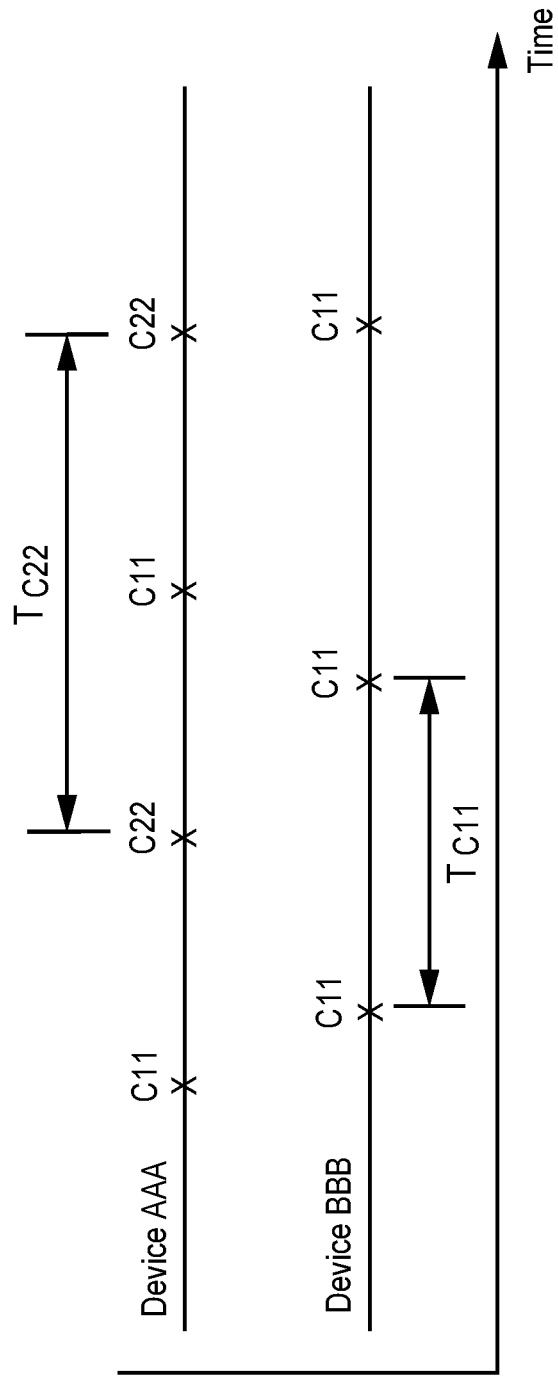
FIG. 12 illustrates the mean time between failures for separate devices and error codes according to the disclosed embodiments.

FIG. 12 depicts the MTBF for separate devices and different error codes according to the disclosed embodiments. When a failure event occurs that prompts an error code to analytical server 130, a timestamp may be given such that the time between errors is determined. Over the course of the monitoring time period to determine the number of errors for the devices, the MTBF also may be determined.

Device model AAA, for example, has a time T(C22) between errors having error code C22. This value is determined for each failure event related to error code C22. Device A also includes failure events for error code C11. Device model BBB may not have failure events related to error code C22 but does have a time T(C11) between errors having error code C11. Some error codes may be device model dependent. For example, only device model AAA will indicate multiple devices affected by error code C22 while devices with models BBB do not indicate error code C22.

These times are compiled by analytical server 130 to determine the MTBF for the different types of devices. The analytical time interval to test the failure events for error code C11 for device models AAA will be longer than the one for device models BBB. In some embodiments, the analytical time interval is twice as long as the MTBF for a failure event. For example, if the MTBF for error code C11 on device model AAA is one month, then an analytical time interval of two months should be used to monitor the failure rate of the upgraded firmware. If the MTBF for error code C11 on device model BBB is three weeks, then an analytical time interval for six weeks may be determined for the number of test devices determined above.

The error codes also may be correlated with an "age" of the printing devices. The age of a printing device may be indicated by a total print volume. Some devices may print up to several million pages during their lifetimes. For instance, some devices that have a low level of total print volume may be affected by specific error or failure events as compared to those devices having a high total print volume. Hardware components may start to break down to result in failure events or errors at a certain "age" or print volume. Thus, analytical server 130 may receive data from the printing devices on their total print volume. Alternatively, analytical server 130 may determine average print volumes for the periods used to determine failure rates and MTBFs for error codes and printing devices.

FIGS. 4-8 depicts the processes used in system 100 to determine whether to install an upgrade to firmware on printing devices within the system. FIGS. 4-8 may refer back to FIGS. 1-3 and 9-12 for illustrative purposes, but the embodiments disclosed by FIGS. 4-8 are not limited by these figures. Further, the processes may be executed on analytical server 130, which reads instructions from the program modules to implement the steps disclosed herein. Alternatively, the processes may be executed on another device of the plurality of printing devices in system 100.

Figure 4:
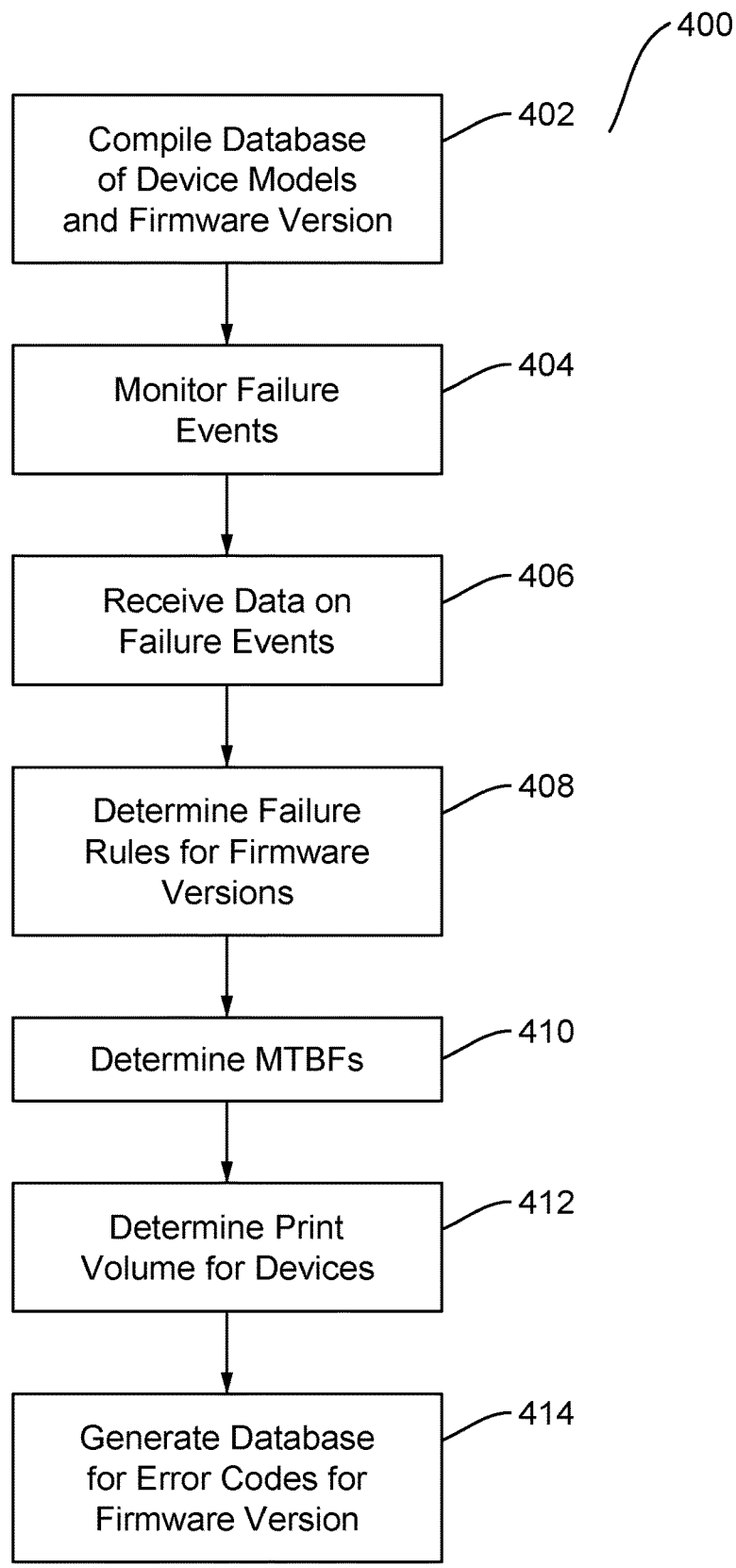
FIG. 4 illustrates a flowchart for determining the parameters for a plurality of printing devices by an analytical server according to the disclosed embodiments.

FIG. 4 depicts a flowchart 400 for determining the parameters for a plurality of printing devices by analytical server 130 according to the disclosed embodiments. Step 402 executes by compiling a database of the device models and firmware version in use within system 100. As disclosed above, different device models may be used that also run different versions of the firmware. These parameters for the different printing devices may be used to generate a database. Referring to FIG. 1, printing devices 102A and 102B may be the same device model, such as device model AAA, but run different versions of the firmware. Printing devices 104A and 104B may be the same device model, such as device model BBB, but also run the different versions of the firmware. For example, printing devices 102A and 104A may run firmware version 001 while printing devices 102B and 104B run firmware version 002. As noted above, different versions of the firmware may result in different error codes on the various devices. Printing device 106 only runs one version of the firmware.

Step 404 executes by monitoring the failure events on the printing devices. Analytical server 130 may be notified whenever a failure event occurs or may receive a report at the completion of a time period, such as the end of the day or month. Step 406, therefore, executes by receiving data from the affected printing devices. Preferably, the data is received at analytical server 130 and used to populate the database of device models and firmware versions. The data should include an error code for the failure event. Analytical server 130 then matches the data to the error code for the firmware version running on the device model.

Step 408 executes by determining the failure rates for the firmware versions executing on the devices within system 100. As disclosed above, analytical server 130 may receive error code and failure event data for a certain period of time for each device in system 100. As shown in FIG. 12, instances where error codes are generated for failure events may be tracked and used to determine the failure rates for the error codes, as disclosed above. Further, the different firmware versions may have different failure rates, as shown in FIGS. 9 and 11. Step 410 executes by determining the MTBFs as well for the failure events having the error codes being reported to analytical server 130. This step also may determine the average MTBF for an error based on determined MTBFs for the number of errors in the device models and firmware versions.

Step 412 executes by determining the total print volume for the devices within system 100. As disclosed above, the total print volume may indicate an "age" of a device. Thus, device models having high total print volumes may indicate older models that have been in service longer than other models. For example, the printing devices of device model AAA may have high total print volumes as compared to the printing devices of device model BBB, which are newer devices. Analytical server 130 also may determine an average print volume for device models and firmware versions. For example, device model AAA may have a low average print volume in that these devices are not used often as compared to device model BBB, which has a high average print volume. This information may be collected by analytical server 130.

Step 414 executes by generating the database for the error codes with the device model and firmware version information. The database may include the parameters of device model, firmware version, error codes for the firmware versions, failure rates for the error codes, the MTBFs for the error codes, and print volume information. This information may be stored at analytical server 130.

Figure 5:
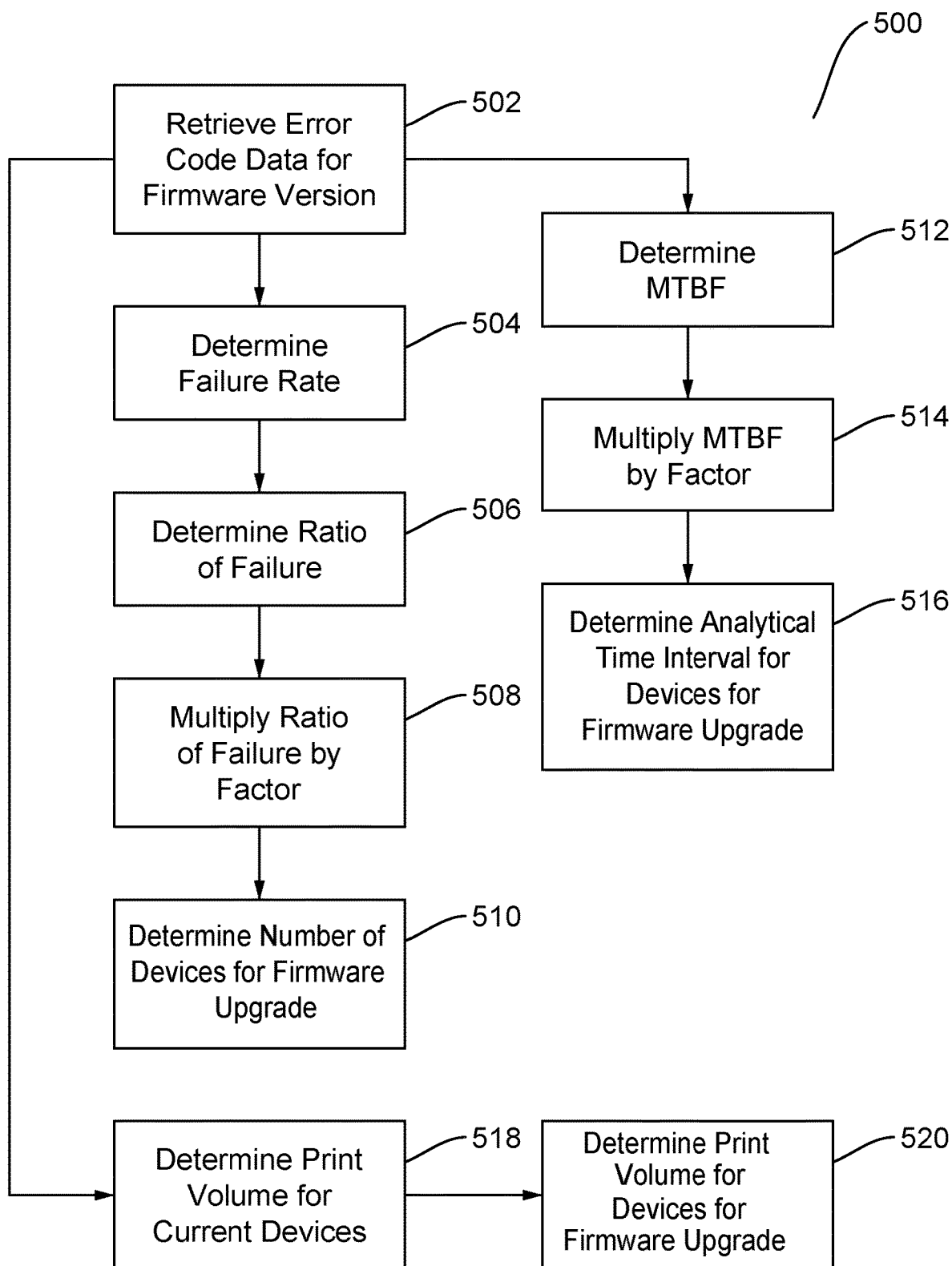
FIG. 5 illustrates a flowchart for determining the number of test devices and other applicable parameters according to the disclosed embodiments.

FIG. 5 depicts a flowchart 500 for determining the number of test devices and other applicable parameters according to the disclosed embodiments. Analytical server 130 is tasked with installing upgrade firmware 112 on the plurality of devices in system 100. Before the full installation is performed, a set of test devices is determined and monitored to analyze whether the upgrade firmware should be installed. This limited number of installations helps prevent the costs and time needed to address problems that may arise from full installation on all printing devices. Further, the disclosed embodiments may identify printing devices that do not need the upgrade firmware so as to reduce installation costs or needless upgrades. Further, the upgrade firmware may be revised or modified to improve the failure rates if the analysis determines not to install the upgrade.

Step 502 executes by retrieving the error code data for the firmware versions from storage 340 in analytical server 130. As shown in FIGS. 9-12, the parameters may be listed for the different device models and firmware versions. Step 504 executes by determining the failure rate for an error code for a firmware version on a device model. Alternatively, the failure rate may be just for the firmware version or the device model, or even devices collectively. Step 506 executes by determining the ratio of failure, as disclosed above. Referring to FIG. 9, the ratio of failure for device model AAA running firmware version 0001 may be (100%/2%). The ratio of failure may represent that for a certain number of devices, at least one will have an error or result in the error code being issued.

Step 508 executes by multiplying the ratio of failure by a factor. In some embodiments, the factor is 2 so that the result is double the ratio of failure. Other factors may be used depending on need to accurately measure failure rates to properly analyze the results of the upgrade firmware. Step 510 executes by determining the number of devices for analyzing the firmware upgrade. This number of test devices is subset of the overall number of devices running the applicable firmware version. As disclosed above, different error codes may result in different numbers for the sets of test devices.

Step 512 executes by determining the MTBF for the error code or devices being used for the failure rate determination in step 504. The determination of the MTBF for error codes and different devices may be disclosed by FIG. 12. Preferably, the MTBF is an average MTBF for the errors detected by the devices within system 100. Step 514 executes by multiplying the MTBF by a factor. This step may be optional. As disclosed above, if the mean time between failures for device model AAA is one week, then the desired analytical time interval may be a factor of two (2), or two weeks. In some embodiments, the upgrade firmware is critical so that that factor is three (3) for an analytical time interval of three weeks. Step 516 executes by determining the analytical time interval for the set of test devices to receive the firmware upgrade. Step 516 may use the result from step 514.

Print volume also may be of interest to the disclosed processes. Thus, step 518 executes by determining a print volume for the devices running the current firmware version. In some embodiments, the print volume may relate to the total print volume of a device or group of devices. As disclosed above, the total print volume relates to the "age" of the printing device. In other embodiments, the print volume may relate to an average print volume for the period of time used to collect failure rates and MTBFs for storage in analytical server 130. Step 520 executes by determining a preferred print volume for the set of test devices. The preferred print volume may be a minimum number of print jobs handled by the set of test devices. Much like analytical time intervals, preferred print volumes ensure that the devices are used in some manner in order to detect possible errors related to printing operations. The term "preferred" may be used as this parameter is optional. Some firmware may not be related to printing operations so that no print jobs need to be handled to detect possible failure events.

Figure 6:
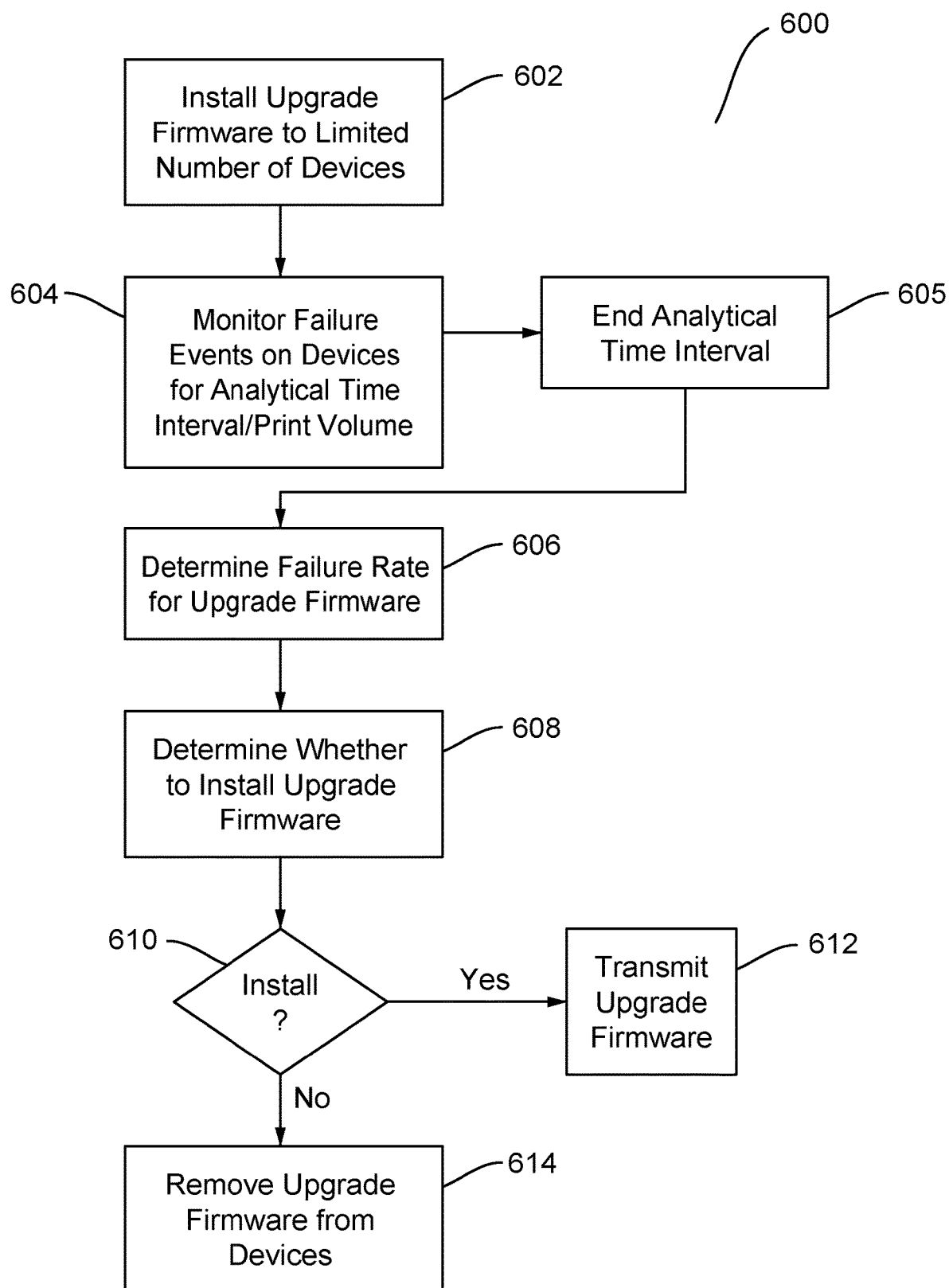
FIG. 6 illustrates a flowchart for determining whether to install upgrade firmware to a plurality of printing devices according to the disclosed embodiments.

FIG. 6 depicts a flowchart 600 for determining whether to install upgrade firmware to a plurality of printing devices according to the disclosed embodiments. As noted above, the disclosed embodiments install the upgrade firmware to a limited number of devices to determine whether to subsequently install the upgrade firmware to a larger number or all of the devices in system 100. This process prevents the need to monitor and account for a large number of upgrades that result in an increased number of existing errors and failure events or new errors. If the upgrade firmware installed on the limited number of devices fails the analysis by analytical server 130, then the upgrade firmware is not installed.

Step 602 executes by installing the upgrade firmware to a limited number of devices within system 100. This limited number may be known as test devices. Analytical server 130 may send upgrade firmware 112 to a subset of devices within the plurality of devices within system 100. Preferably, the number of devices is determined based on failure rates of legacy devices running previous versions of the firmware. Referring to FIG. 1, printing devices 102 may be the test devices to receive upgrade firmware 112 as opposed to all of printing devices 102, 104, 106, and 110. This number, as disclosed by Equation 1 above, may be double the previous ratio of failure for the devices, error codes, or firmware versions.

Step 604 executes by monitoring failure events on the number of test devices for the analytical time interval determined above. In some embodiments, sensors 262 may collect information for failure events, or errors, caused while executing upgrade firmware 112. The data may be sent to analytical server 130. Using the example above, printing device 102A sends data 122A and printing device 102B sends data 122B when failure events occur. The data may include the appropriate error code, timestamp when the failure event occurred, and other parameters. In some embodiments, a preferred print volume also may be used in conjunction with the analytical time period. A certain, or preferred, number of pages should be printed before stopping the analysis period.

Step 605 executes by ending the analytical time period. Although the test devices may still report errors and associated information to analytical server 130, this data will not be used for subsequent determinations of the performance of upgrade firmware 112. The features disclosed by steps 604 and 605 may be illustrated in greater detail by FIG. 13, which depicts a line graph 1300 of monitoring during an analytical time interval 1302 according to the disclosed embodiments. Line graph 1300 shows the monitoring performed on printing devices 102A and 102B. The number of test devices for printing devices 102A and 102B may be determined as disclosed above. Line graph 1300 shows the results of each printing device.

Upgrade firmware 112 is installed onto printing devices 102A and 102B. At T0, analytical time interval 1302 begins monitoring for failure events on the printing devices. Analytical time interval 1302 ends at TN, which is the amount of time determined in step 516 for the test devices. Another parameter may be print volume during analytical time interval 1302. If a preferred print volume is not achieved during the analytical time interval, then it may be extended until the preferred print volume is met. Failure events, or errors, that occur during analytical time interval 1302 may be detected in each device and associated with an error code 1002. Printing device 102A may detect failure events FE for errors having error codes C0001 and CF002, shown as "x" in the lines for the error codes. The errors associated with error codes C0002 and CF001 do not have failure events. Failure events FE also result in data 122A being sent from printing device 102A to analytical server 130 to record the error along with the associated error code.

Printing device 102B also executes upgrade firmware 112 for analytical time interval 1302. Failure events FE are detected for errors associated with error codes CF001 and CF002. Referring back to FIG. 10, these errors may relate to software packages in the firmware. Printing device 102B sends data 122B to notify analytical server 130 about the errors. Thus, in executing upgrade firmware 112 during analytical time interval 1302, printing devices 102A and 102B failed at least once with an error associated with error code CF002. Thus, two devices are reported failing during the time interval and this number will be added to other devices reporting failures during this period. For the other error codes, the number of devices having the associated failure event with be increased by one.

Returning to flowchart 600, step 606 executes by determining the failure rate for the test devices during the analytical time interval. As shown by FIGS. 9-13, the failure rate may include one for device models, firmware versions, or error codes. In other words, the disclosed embodiments can determine the failure rate based on the number of devices that failed, the number of devices running a specific firmware version failed, or the number of devices that reported an error code for a specified error. The failure rate may be calculated as disclosed above. If printing devices 102A and 102B are the only devices that failed during analytical time interval 1302, then the failure rate for a set of 200 test devices would be 100*2/200, or 1%. Depending on which analysis is being done (device, firmware version, or error code), it may make sense to not install upgrade firmware 112.

Step 608 executes by determining whether to install upgrade firmware 112 in the plurality of devices, or the total number of devices being considered for the upgrade. The disclosed embodiments compare the failure rate observed for the test devices determined above with the failure rate stored for the previous firmware as determined in flowchart 500. As disclosed above, this failure rate is used to determine the number of test devices to receive upgrade firmware 112. Now, it is used to determine if firmware upgrade 112 should be installed on all the devices in consideration. If the new failure rate is higher or equal to the previous rate, then upgrade firmware 112 should not be installed. If it is lower, then upgrade firmware 112 should be installed on the plurality of printing devices.

Step 610 executes by determining whether to install upgrade firmware 112 on the plurality of devices that form the set of test devices. Based on the failure rates observed above, analytical server 130 may determine whether to install or not. If yes, then step 612 executes by transmitting upgrade firmware 112 from analytical server 130 to the applicable devices in system 100. If no, then step 614 executes by removing upgrade firmware 112 from the test devices, such as printing devices 102A and 102B.

As noted above, failure rates may be observed for any device, device model, firmware version, or error code of the test devices. The upgrade recommended by flowchart 600 also may be tailored to all of the firmware, packages within the firmware, or only for certain devices. Referring back to FIG. 13, printing device 102A may be one of a number of test devices having previous firmware version FW 001 while printing device 102B may be one of a number of test devices having previous firmware version FW 002. Both devices report failure events while running the upgrade firmware during analytical time interval 1302. Using the disclosed processes, the failure rate for the devices of printing devices 102A and 102B may be 1.5%. The disclosed embodiments would recommend installing the upgrade firmware on printing devices 102A but not on printing devices 102B, based on the failure rates shown in FIG. 9.

Figure 13:
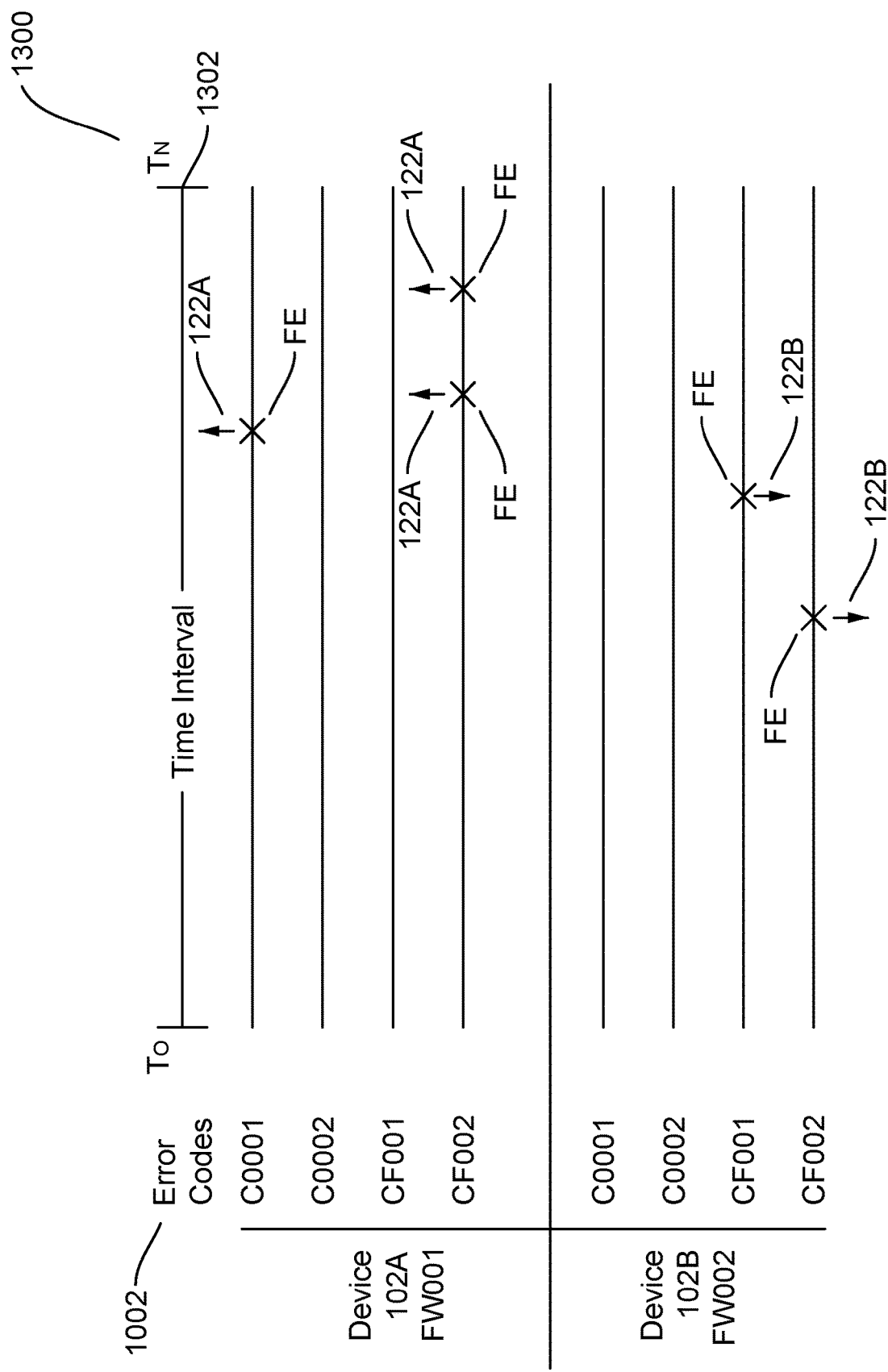
FIG. 13 illustrates a line graph of monitoring during an analytical time interval according to the disclosed embodiments.

If the disclosed embodiments determined whether to upgrade by firmware packages, then the failure rates using the error codes may be used to determine whether to upgrade the packages. Referring to FIGS. 10 and 13, C-codes may refer to hardware failures while CF-codes may refer to software failures. The current firmware and upgrade firmware 112 may include a hardware package and a software package. The error codes may be monitored during analytical time interval 1302 to determine the failure rates for hardware and software failure events. Printing device 102A may have failure events related to both packages while printing device 102B only has failure events related to the software package. Thus, failure events on two devices may result in a failure rate higher for the software package than the hardware package. Flowchart 600, therefore, may determine to install the upgrade firmware hardware package but not the software package, depending on the failure rates for the previous packages. These packages may be further broken down by error codes so that the upgrades are tied to resolving specific errors caused by the failure events.

Figure 7:
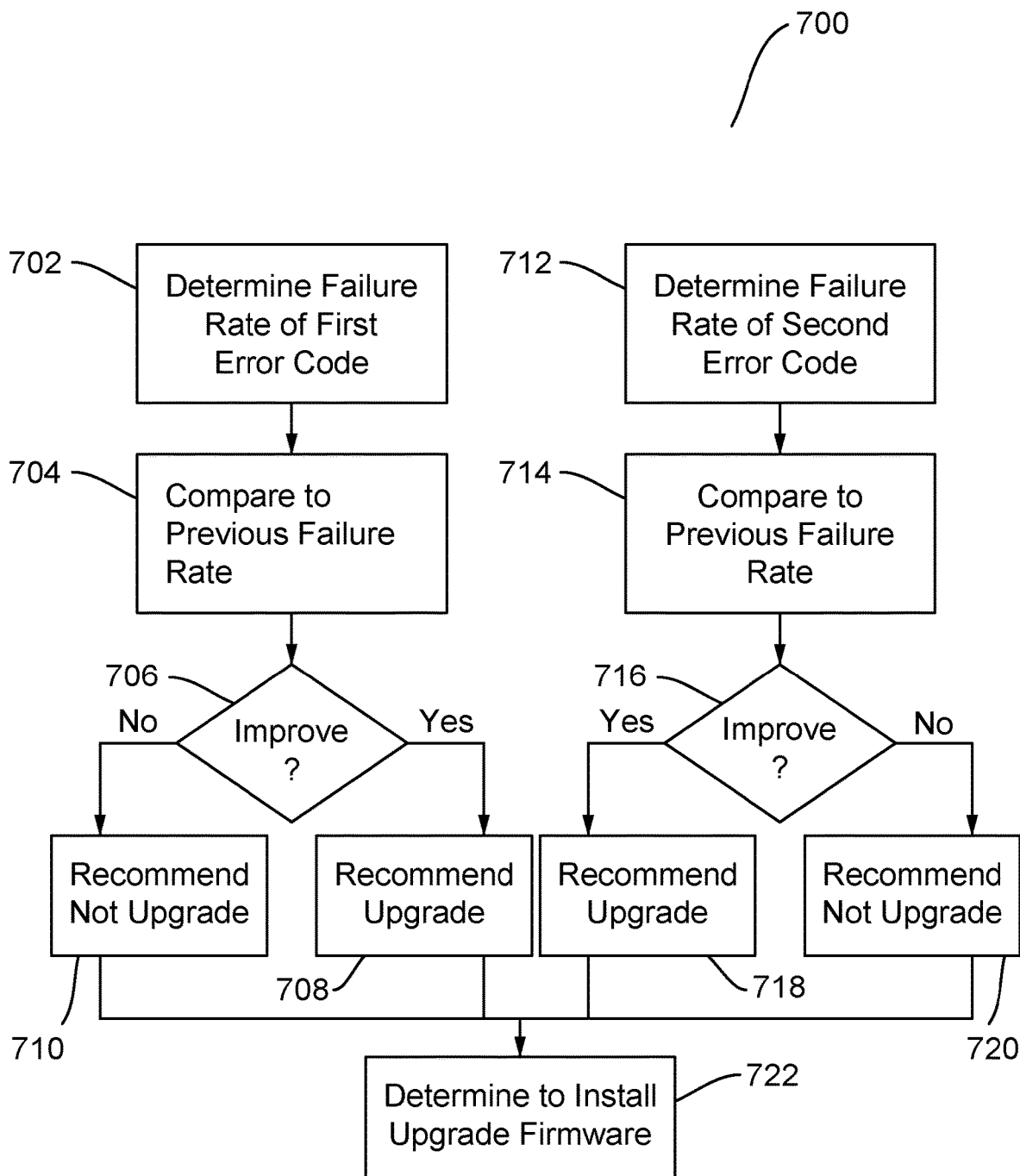
FIG. 7 illustrates a flowchart for determining to upgrade firmware according to failure rates for different error codes according to the disclosed embodiments.

FIG. 7 depicts a flowchart 700 for determining to upgrade firmware according to failure rates for different error codes according to the disclosed embodiments. Flowchart 700 may disclose those instances where more than one error code is used to determine whether to install upgrades on a set of devices. For example, failure rates for failure events associated with event codes C0001 and CF001 may be monitored on the limited number of devices to determine whether to install the upgrade firmware. As disclosed above, error code C0001 may relate to a hardware failure while CF001 may relate to a software failure.

Step 702 executes by determining the failure rate of the first error code, or error code C0001, for upgrade firmware 112. The failure rate may be determined during analytical time interval 1302, as disclosed above. Step 704 executes by comparing the failure rate for failure events associated with the first error code determined during the analytical time interval with the failure rate of the first error code of the previous firmware version. The previous failure rate for error code C0001 may be stored in a database on analytical server 130. Step 706 executes by determining whether the upgrade firmware improves the failure rate for the first error code C0001. If yes, then step 708 executes by recommending the upgrade firmware be installed. If no, then step 710 executes by recommending the upgrade firmware not be installed.

Step 712 executes by determining the failure rate of the second error code, or error code CF001, for upgrade firmware 112. The failure rate may be determined during analytical time interval 1302, as disclosed above. Step 714 executes by comparing the failure rate for failure events associated with the second error code determined during the analytical time interval with the failure rate of the second error code of the previous firmware version. The previous failure rate for error code CF001 may be stored in a database on analytical server 130. Step 716 executes by determining whether the upgrade firmware improves the failure rate for the second error code CF001. If yes, then step 718 executes by recommending the upgrade firmware be installed. If no, then step 720 executes by recommending the upgrade firmware not be installed.

Step 722 executes by determining whether to install the upgrade firmware based on the determinations in steps 706-10 and 716-20. If the analysis of both error codes recommends installation of the upgrade firmware, then it will be installed on all the applicable devices. If the analysis indicates that the failure rates of both error codes will increase, or new errors will be found, then analytical server 130 will not install the upgrade firmware. In the instance where one failure rate for an error code is reduced but increased for the other error code, analytical server 130 may follow specified rules to determine whether to upgrade the firmware. Some error codes may be more critical to resolve than others so if those failure rates are reduced, then the upgrade firmware is installed.

For example, the failure rate for the first error code C0001 detected in the first set of printing devices running the legacy version of the firmware is 10%. The failure rate for the first error code C0001 detected in the second set of test devices running the upgrade firmware version is 2%. The failure rate for the second error code CF001 detected in the first set of printing devices running the legacy version of the firmware is 10%. The failure rate for the second error code CF001 detected in the second set of test devices running the upgrade firmware version is 8%. According to the analysis, step 722 would recommend installing the upgrade firmware on the applicable devices because the occurrences of failure events associated with both error codes are reduced. If the opposite occurred in that the failure rates associated with both error codes increased, then step 722 would not recommend installation of the upgrade firmware.

In another example, the failure rate for the first error code C0001 detected in the first set of printing devices running the legacy version of the firmware is 10%. The failure rate for the first error code C0001 detected in the second set of test devices running the upgrade firmware version is 2%. The failure rate for the second error code CF001 detected in the first set of printing devices running the legacy version of the firmware is 10%. The failure rate for the second error code CF001 detected in the second set of test devices running the upgrade firmware version is 12%. According to the analysis, step 722 would recommend or not recommend installing the upgrade firmware on the applicable devices based on other criteria. For example, if hardware errors were determined to be more critical to operation of the printing devices, then step 722 may recommend installation of the upgrade firmware.

Software fixes may be easier to implement than hardware fixes. Another factor may be the percentage change between the failure rates. The upgrade firmware reduces the failure rate of failure events associated with first error code C0001 by 8% while increasing the failure rate of failure events associated with second error code CF001 by 2%. Overall, it may be determined that the failure rate for the devices having these error codes is improved by 6% so step 722 recommends installing the upgrade firmware.

Figure 8:
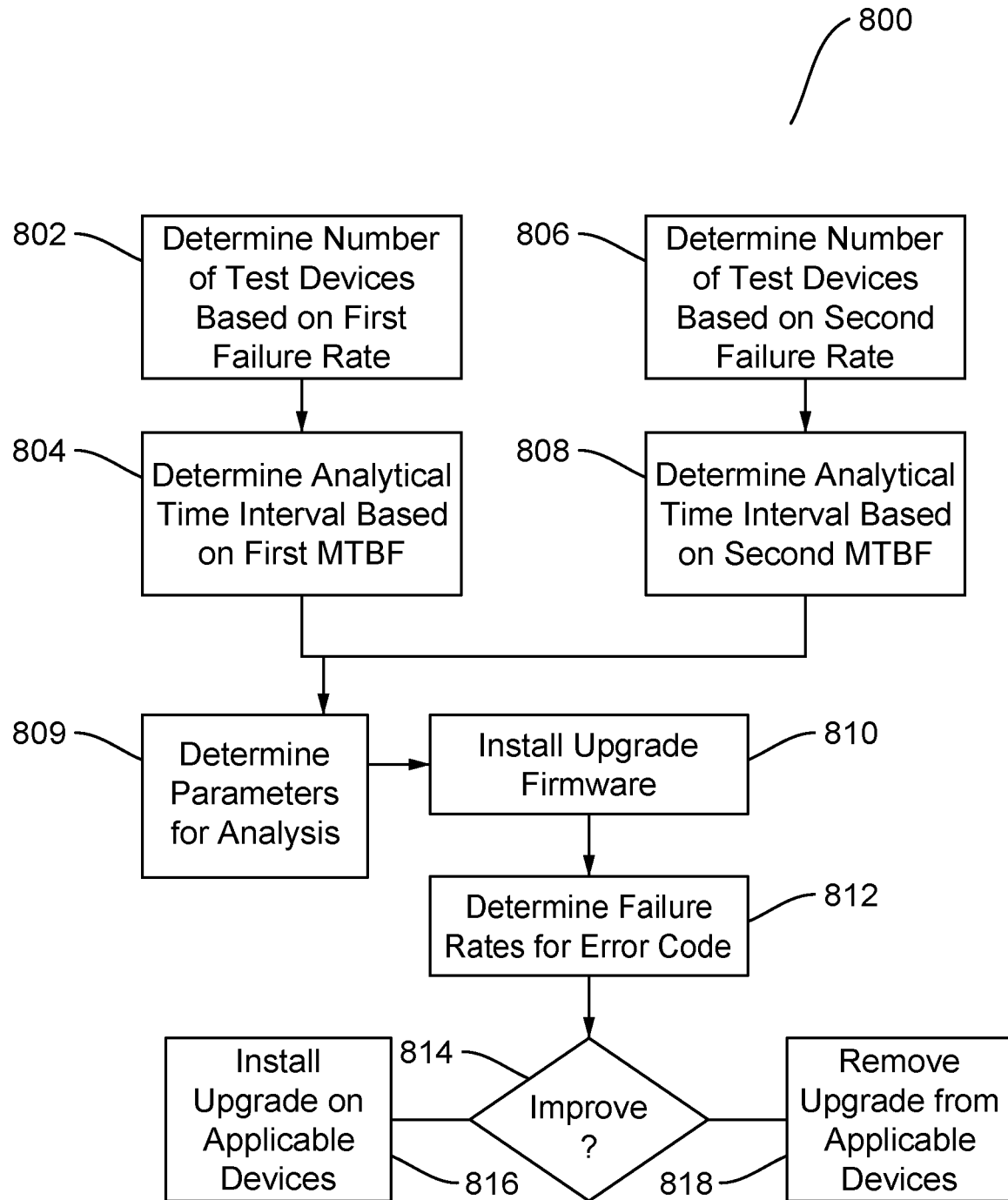
FIG. 8 illustrates a flowchart for upgrading firmware on two sets of printing devices having different versions of the firmware according to the disclosed embodiments.

FIG. 8 depicts a flowchart 800 for upgrading firmware on two sets of printing devices having different versions of the firmware according to the disclosed embodiments. In some instances, a common error code between different versions of firmware may be used to determine whether to upgrade all applicable devices. The error code should apply to a hardware or software component common to all devices. In other words, the disclosed embodiments may monitor the failure rates of an error code associated with critical errors that impacts a variety of devices or firmware versions as opposed to the failure rates of entire devices or firmware versions. This feature may reduce the impact of the upgrade firmware on the test devices and the requirements needed to determine whether to upgrade. Analytical server 130 only needs to receive and analyze incidents related to the error code. As noted above, however, the devices should have a common hardware or software component that invokes the error code.

Step 802 executes by determining a number of test devices based on a first failure rate for failure events associated with the error code pertaining to a first set of devices. The number of test devices is determined as disclosed above. Referring to FIG. 1, printing devices 102A and 102B may be in the first set of devices that run a first version of the firmware. The error code under consideration may be error code C0001. Step 804 executes by determining an analytical time interval based on a first MTBF for error code C0001 within the set of printing devices 102A and 102B.

Step 806 executes by determining a number of test devices based on a second failure rate for failure events associated with error code C0001 pertaining to a second set of devices. The number of test devices is determined as disclosed above. Referring to FIG. 1, printing devices 104A and 104B may be in the second set of devices that run a second version of the firmware. Printing devices 104A and 104B include a hardware component associated with error code C001 also used by printing devices 102A and 102B. Step 808 executes by determining an analytical time interval based on a second MTBF for error code C0001 within the set of printing devices 104A and 104B.

Step 809 executes by determining the parameters for use in the analysis of the failure rates according to error code C0001 caused by the upgrade firmware. In some embodiments, the number of test devices determine for the first set of devices may be combined with the number of test devices determined for the second set of devices. The different sets also may use their respective analytical time intervals to measure failure rates of failure events associated with error code C0001. Analytical server 130 may monitor both sets of devices separately.

Alternatively, the larger number of the numbers and the longer analytical time interval of the intervals for each set may be used. In other words, the number for the first test set of printing devices 102A and 102B may be 50 devices while the number for the second test set of printing devices 104A and 104b may be 30 devices. The analytical time interval for the first test set may be 3 weeks while the analytical time interval for the second test set may be 5 weeks. Thus, the disclosed embodiments may analyze the upgrade firmware on 50 devices in each set for 5 weeks. This feature may result in common numbers and results for the error code. In other embodiments, the numbers and intervals may be the average values between the sets, or 40 devices in each set that are monitored for 4 weeks. This feature may be used for multiple sets of test devices having a common component associated with the error code.

Step 810 executes by installing the upgrade firmware on the first set of test devices and the second set of test devices as determined above. Step 812 executes by determining the failure rates in each set for the failure events associated with error code C0001. The determination of failure rates for the errors detected to the analytical time interval is disclosed above. Using the determined failure rates for error code C0001, step 814 executes by determining whether the upgrade firmware reduces the number of errors associated with error code C0001 on the hardware component in the first set of test devices, such as printing devices 102A and 102B, reduces the number of errors associated with error code C0001 on the same hardware component in the second set of test devices, such as printing devices 104A and 104B, or both. Depending on the results of the failure rate analysis, if step 814 is yes for either set of test devices, then step 816 executes by installing the upgrade firmware on the applicable set of devices. If the failure rate is lowered for the hardware component in both test sets, then both sets will be upgraded with the new version of the firmware. If step 814 is no, then step 818 executes by removing the upgrade firmware from the applicable printing devices.

Figure 14:
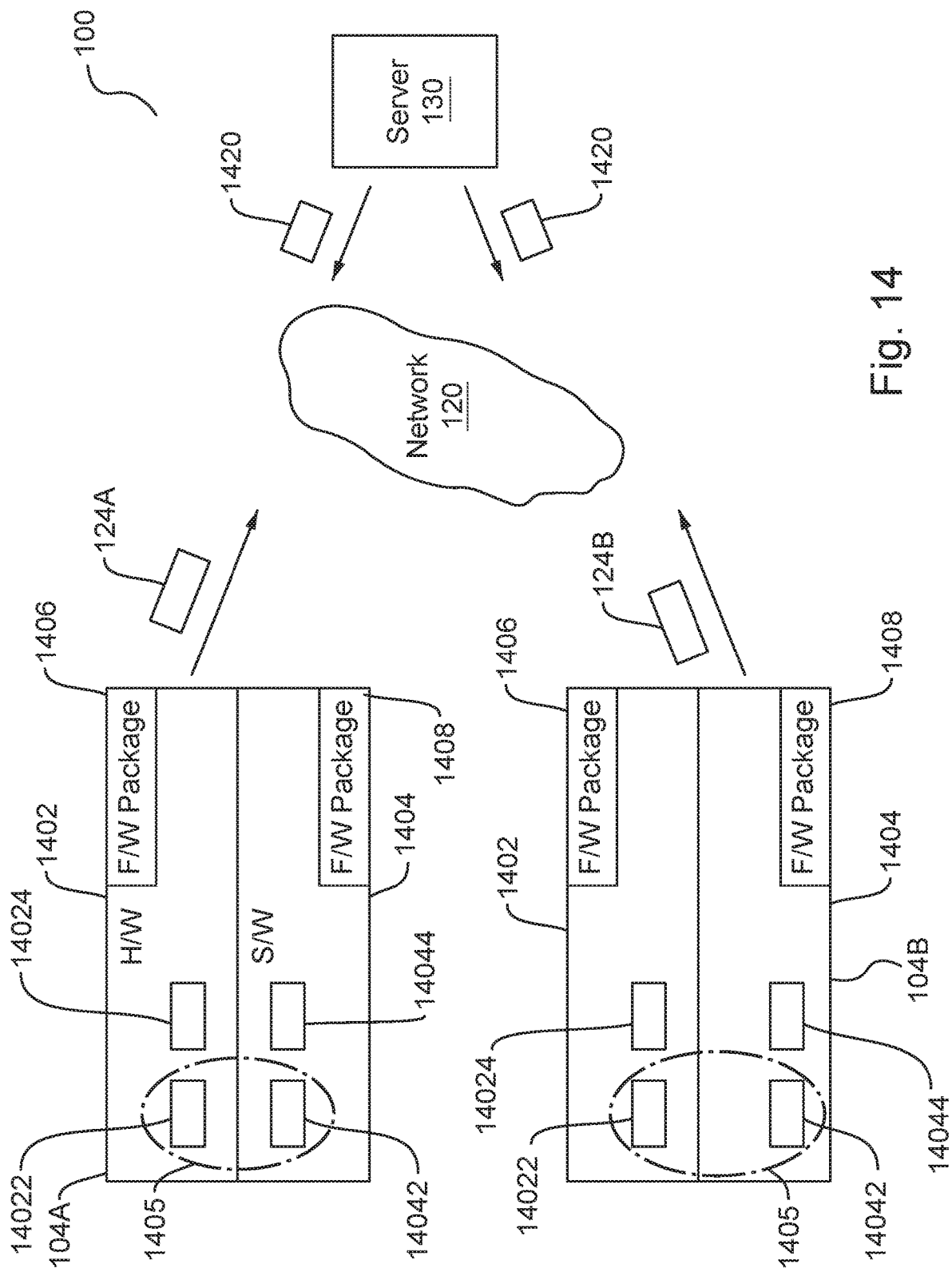
FIG. 14 illustrates a block diagram of the system upgrading firmware packages of firmware according to the disclosed embodiments.

FIG. 14 depicts a block diagram of system 100 upgrading firmware packages of firmware according to the disclosed embodiments. As disclosed above, firmware running on printing devices may be broken into firmware packages. Each firmware may include different packages. Each package may relate to a certain part of the device, such as hardware components and software components. It also may relate to a particular function of the printing device such as image processing that may include hardware and software components. In some embodiments, upgrades to the firmware packages may be desired as opposed to complete upgrades to the firmware. Firmware package upgrades may be less costly or time-consuming to implement, especially if they are to address a specific problem within the printing devices.

System 100 includes printing devices 104A and 104B. In this example, printing devices 104A and 104B may be part of a plurality of printing devices that includes many types of printing devices that host different firmware packages related to different components in sub-systems of the printing devices. FIG. 14 discloses components on each printing device. These components are common to each printing device.

Referring to printing device 104A, printing sub-systems 1402 and 1404 are shown. These features of the printing devices also may be known as sub-systems. Each sub-system includes individual components on each printing device. Thus, sub-system 1402 may include hardware components 14022 and 14024. Component 14022 may refer to a mechanical part in printing device 104A while component 14024 may refer to components in scanner components 224. Each sub-system 1402 or component may have a firmware package 1406 associated with it. Firmware package 1406 may be part of firmware 112 for printing device 104A. Sub-system 1404 may include software components 14042 and 14044. Firmware package 1408 may be associated with sub-system 1404, or with its components. In addition, the printing devices may include sub-system 1405 which can include hardware component 14022 and software component 14042. As can be appreciated, the printing devices may include any number of sub-systems that address specific functions as well as multiple components that comprise the sub-systems. Further, a component may be within more than one sub-system.

As can be seen in FIG. 14, printing device 104B includes the same sub-systems and components as printing device 104A. Each firmware package also should be the same on the different printing devices. In some embodiments, at least one sub-system or component associated with a firmware package on the printing devices should be substantially the same. In other words, software component 14042 on the printing devices may not be identical in terms of actual code but may perform the same function using firmware package 1408.

As components fail or break down, printing devices 104A and 104B may send data 124A and 124B, respectively, to analytical server 130, as disclosed above. Using the processes disclosed above, analytical server 130 may determine a number of test printing devices on which to install upgrade firmware package 1420. Upgrade firmware package 1420 may update firmware package 1406 or firmware package 1408, but preferably not both. Upgrade firmware package 1420 may be used across different printing devices with different configurations but addresses the part of the firmware for a common component within the printing devices.

For example, analytical server 130 may need to determine whether to install upgrade firmware package 1420 for firmware package 1406, which is associated with component 14022 on the printing devices. The disclosed embodiments may determine a number of test devices based on the failure rate of firmware package 1406 as well as an analytical time interval to monitor upgrade firmware package 1420 on the test printing devices. In another embodiment, the observed failure rate may relate to a component controlled by firmware package 1406. Analytical server 130 selects the number of test printing devices. In this instance, printing device 104A is selected to install upgrade firmware package 1406 but printing device 104B is not.

During the analytical time interval, failure event information is collected by analytical server 130, as disclosed above. A failure in one of the components may result in the appropriate error code being generated and sent from printing device 104A. At the end of the analytical time interval, the failure rate is determined for upgrade firmware package 1420. Using the processes disclosed above, analytical server 130 determines whether to upgrade all of the printing devices based on the failure rate observed on the test printing devices. Specifically, analytical server 130 may determine whether the failure rate of at least one component associated with the firmware package is improved by the upgrade firmware package. If so, then upgrade firmware package 1420 may be installed on all the applicable printing devices, such as printing device 104B. If not, then upgrade firmware package 1420 may be removed from printing device 104A.

In other example, firmware package 1408 is implemented to help sub-system 1405. Sub-system 1405 may be the image processing sub-system that uses hardware and software components. Printing devices 104A and 104B are both selected by analytical server 130 as test printing devices. Analytical server 130 installs upgrade firmware package 1420 to possibly replace firmware package 1408. During the analytical time interval, image processing functions and components are monitored for failure events. In printing device 104A, hardware component 14022 may fail, thereby resulting in an error code being sent in data 124A. In printing device 104B, software component 14042 may fail, thereby resulting in a different error code being sent in data 124B. Analytical server 130, however, will note these failure events as both associated with firmware package 1408 in determination of the failure rate.

Thus, the disclosed embodiments may implement partial upgrades to firmware on the printing devices using the disclosed processes. If the failure rate is improved, then the upgrade may be installed on all the devices. Further, analytical server 130 may install multiple firmware package upgrades on a test number of printing devices and only move forward with installation of upgrade packages that improve the failure rate. Although firmware 112 is upgraded, not every package is upgrade accordingly. This feature allows for selectively improving the operation of a system of printing devices in more efficient manner.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for upgrading a first firmware package of firmware for a plurality of printing devices, wherein the first firmware package corresponds to a component within each of the plurality of printing devices, the method comprising:
    determining a number of test printing devices from the plurality of printing devices based on a first failure rate for the plurality of printing devices;
    determining an analytical time interval for the test printing devices according to a mean time between failures for the plurality of printing devices;
    installing an upgrade firmware package for the first firmware package on the test printing devices;
    determining a second failure rate for the component during the analytical time interval on the test printing devices; and
    determining whether to install the upgrade firmware package to the plurality of printing devices according to the second failure rate,
    wherein the second failure rate corresponds to at least one failure event in the component in each of the test printing devices.

2. The method of claim 1, further comprising generating an error code for the at least one failure event, wherein the error code indicates a specific error in the component.

3. The method of claim 1, further comprising removing the upgrade firmware package from the test printing devices based on the second failure rate.

4. The method of claim 1, wherein the first failure rate corresponds to failure events in the component associated with the first firmware package.

5. The method of claim 1, wherein the firmware includes a second firmware package associated with another component within each of the plurality of printing devices.

6. The method of claim 5, wherein the upgrade firmware package does not replace the second firmware package.

7. The method of claim 1, wherein the component is a hardware component.

8. A system of a plurality of printing devices, each of the plurality of printing devices having a first firmware package of firmware, wherein the first firmware package corresponds to a component within each of the plurality of printing devices, the system configured to determine a number of test printing devices from the plurality of printing devices based on a first failure rate for the plurality of printing devices;
    determine an analytical time interval for the test printing devices according to a mean time between failures for the plurality of printing devices;
    install an upgrade firmware package for the first firmware package on the test printing devices;
    determine a second failure rate for the component during the analytical time interval on the test printing devices; and
    determine whether to install the upgrade firmware package to the plurality of printing devices according to the second failure rate,
    wherein the second failure rate corresponds to at least one failure event in the component in each of the test printing devices.

9. The system of claim 8, the system further configured to generate an error code for the at least one failure event, wherein the error code indicates a specific error in the component.

10. The system of claim 8, the system further configured to remove the upgrade firmware package from the test printing devices based on the second failure rate.

11. The system of claim 8, wherein the first failure rate corresponds to failure events in the component associated with the first firmware package.

12. The system of claim 8, wherein the firmware includes a second firmware package associated with another component within each of the plurality of printing devices.

13. The system of claim 12, wherein the upgrade firmware package does not replace the second firmware package.

14. The system of claim 8, wherein the component is a hardware component.

15. A server to upgrade a first firmware package of firmware for a plurality of printing devices, wherein the first firmware package corresponds to a component within each of the plurality of printing devices, the server comprising:
    a processor;
    a memory coupled to the processor, wherein the memory stores instructions that, when executed on the processor, configure the server to determine a number of test printing devices from the plurality of printing devices based on a first failure rate for the plurality of printing devices;
    determine an analytical time interval for the test printing devices according to a mean time between failures for the plurality of printing devices;
    install an upgrade firmware package for the first firmware package on the test printing devices;
    determine a second failure rate for the component during the analytical time interval on the test printing devices; and
    determine whether to install the upgrade firmware package to the plurality of printing devices according to the second failure rate,
    wherein the second failure rate corresponds to at least one failure event in the component in each of the test printing devices.

16. The server of claim 15, wherein the instructions stored in the memory, when executed on the processor, configure the server to generate an error code for the at least one failure event, wherein the error code indicates a specific error in the component.

17. The server of claim 15, wherein the instructions stored in the memory, when executed on the processor, configure the server to remove the upgrade firmware package from the test printing devices based on the second failure rate.

18. The server of claim 15, wherein the first failure rate corresponds to failure events in the component associated with the first firmware package.

19. The server of claim 15, wherein the firmware includes a second firmware package associated with another component within each of the plurality of printing devices.

20. The server of claim 19, wherein the upgrade firmware package does not replace the second firmware package.

* * * * *